United States Patent [19]

Futterer et al.

[11] 4,327,479
[45] May 4, 1982

[54] METHOD FOR ASSEMBLING A STATOR FOR AN ELECTRIC MACHINE

[75] Inventors: Bodo Futterer, Lucerne; Jürgen Mayer; Hugo Fritschy, both of Sachseln, all of Switzerland

[73] Assignee: Interelectric Aktiengesellschaft, Sachseln, Switzerland

[21] Appl. No.: 259,313

[22] Filed: Apr. 30, 1981

Related U.S. Application Data

[60] Continuation of Ser. No. 43,178, May 29, 1979, abandoned, which is a division of Ser. No. 865,979, Dec. 30, 1977, Pat. No. 4,173,822.

[51] Int. Cl.³ .............................................. H02K 15/14
[52] U.S. Cl. ........................................ 29/596; 29/736; 310/42; 310/266
[58] Field of Search ................. 29/596, 598, 732, 736; 310/42, 266, 89

[56] References Cited

U.S. PATENT DOCUMENTS 3,383,446   5/1968   Brennecke ...................... 264/262 X
3,467,847   9/1969   Faulhaber ............................ 310/266
3,555,651   1/1971   Latussek et al. ....................... 29/736

Primary Examiner—Carl E. Hall
Attorney, Agent, or Firm—Townsend and Townsend

[57] ABSTRACT

A method for assembling a stator for an electric machine having a permanent magnet for generating a magnetic field in an air gap. Assembly of the stator is performed with the aid of a plunger, the cross section of which corresponds to the cross section of the air gap. The permanent magnet is slid into the interior of the plunger, whereas the flux return ring is slid over the same. The so formed sub-assembly is put into a casting mold adapted to be filled with a plastic material, which in its cured or hardened state forms a casing intimately surrounding the outer surface of the flux return ring and forming a face plate, to which the permanent magnet adheres. When the plastic material has set, the casting mold is opened and the plunger is retracted from the sub-assembly, resulting in a close toleranced cylindrical air gap space. After insertion of a bell-shaped rotor, a brush cover is assembled opposite the face plate. The flux return ring may be longitudinally slotted and biased so as to more intimately contact the calibrated tube during assembly in order to reduce the air gap tolerances. Instead of a plastic casing, a cup-shaped casing of malleable or deformable material may be used.

4 Claims, 5 Drawing Figures

METHOD FOR ASSEMBLING A STATOR FOR AN ELECTRIC MACHINE

This is a Continuation of application Ser. No. 043,178, filed May 29, 1979, now abandoned, a Division of application Ser. No. 865,979, filed Dec. 30, 1977 and now issued as U.S. Pat. No. 4,173,822.

BACKGROUND OF THE INVENTION

The invention pertains to a method of assembling a stator for an electric machine of the type utilizing a bell-shaped rotor which is freely rotatable in a cylindrical air gap provided between a permanent magnet and a cylindrical flux return part surrounding the permanent magnet in an equidistant relationship.

In assembling machines of a general construction described above, the permanent magnet is filled with plastic material and is glued to a face plate. The assembly is then bored to provide a bearing seat and is secured to a flux return element, for example, by a press fit. The manufacture of such an electric machine is expensive and presents serious problems in achieving close tolerances.

It is further known to interconnect the permanent magnet and the flux return element by a face plate made of a plastic material. Such a design requires close tolerances of the permanent magnet as well as of the flux return element and is likewise costly in manufacture.

In another known construction, the permanent magnet and a face plate made of aluminum are secured by injecting a curable plastic material.

It another widespread known stator, the flux return ring is press fitted into a housing in a distance from the face plate. Such a construction, however, necessitates machining the outer surface of the flux return ring as well as the inner surface of the housing to close tolerances and therefore is rather costly.

It is an object of the invention to provide a method for assembling a stator for an electric machine of the aforementioned kind, which method is easy to perform and requires machining to high tolerances of but a few components of the stator.

It is another object of the invention to provide such a method for assembling, which does not necessitate machining the flux return ring to high tolerances.

BRIEF SUMMARY OF THE INVENTION

These and other objects are achieved by a method in which the permanent magnet is placed into the interior of a die having a plunger, the radial dimensions of which correspond to the desired radial dimensions of the air gap. Thereafter or concurrently therewith, the flux return ring is placed over the calibrated tube. The so-formed sub-assembly is placed into a casting mold which conforms to the desired configuration of the finished stator. The plunger may be part of the casting mold. After closing the same, plastic material is injected and allowed to cure. Thereafter, the casting mold may be opened and the stator may be retracted. The so-formed stator has a uniform air gap configuration in which the flux return ring is equidistantly or concentrically arranged with respect to the outer surface of the permanent magnet.

In order to prevent the plastic material from penetrating into the air gap space when injected into the casting mold, a sealing ring may be placed onto the permanent magnet and onto the flux return part in an abutting relationship.

In an alternate method, the permanent magnet is at first affixed to the side face plate, which may be done in a casting mold which contains the permanent magnet, so that both elements are fixedly secured to one another. After sliding the permanent magnet into the interior of the calibrated tube and sliding the flux return ring over the tube, a prefabricated cup-like shaped housing having a central opening at its bottom part is placed over the side face plate and over the flux return ring, such that it snugly surrounds the same.

The flux return part may be provided with a longitudinal slot prior to sliding it over the plunger. By this means it is possible to adjust the inner diameter of the flux return ring without machining the same. If a plastic casing is used, the flux return ring is preferably biased such that it tends to close the slot. During injection molding of the casing, plastic material penetrates into the slot and, when cured, does not admit lowering the width of the slot, thus fixing the flux return ring in a position coaxially aligned with the permanent magnet.

In the alternate method, in which a metal casing is used instead of a plastic casing, the flux return ring should be biased radially outwardly, thus tending to widen the slot. The pot-shaped metal casing, when stripped over the flux return ring, may be deep-drawn or rolled thereafter to the correct inner diameter of the flux return ring.

BRIEF DESCRIPTION OF THE DRAWINGS

The invention, together with further objects and advantages thereof, may be best understood by reference to the following description taken in connection with the accompanying drawings.

In the drawings.

DETAILED DESCRIPTION OF THE PREFERRED EMBODIMENTS

Figure 1:
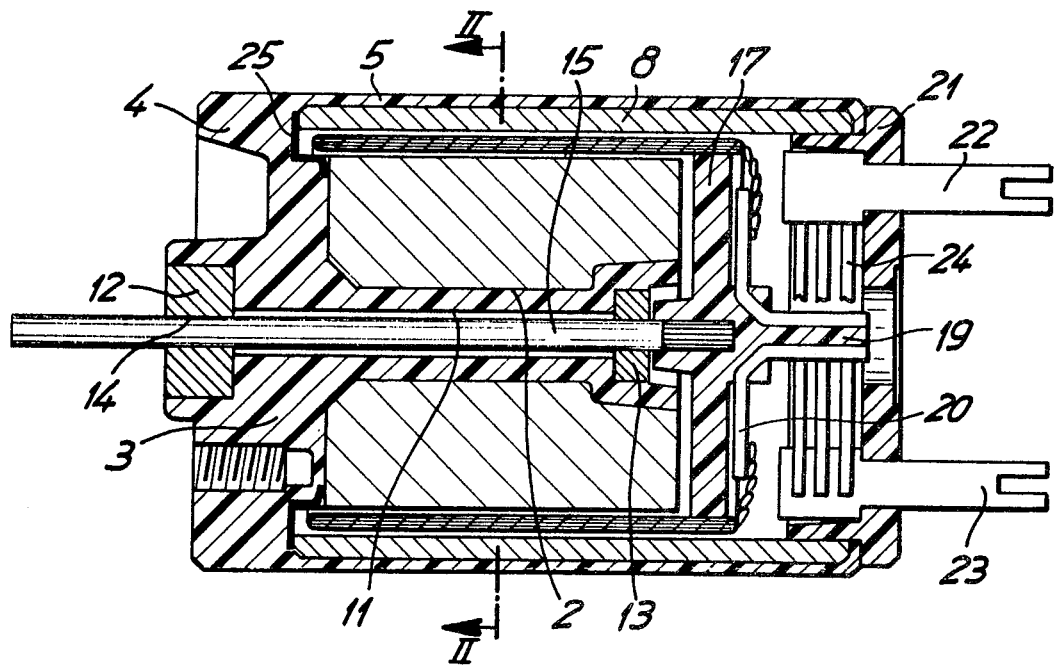
FIG. 1 is a longitudinal cross-sectional view through a d.c. motor comprising a stator manufactured in accordance with the invention.
Figure 2:
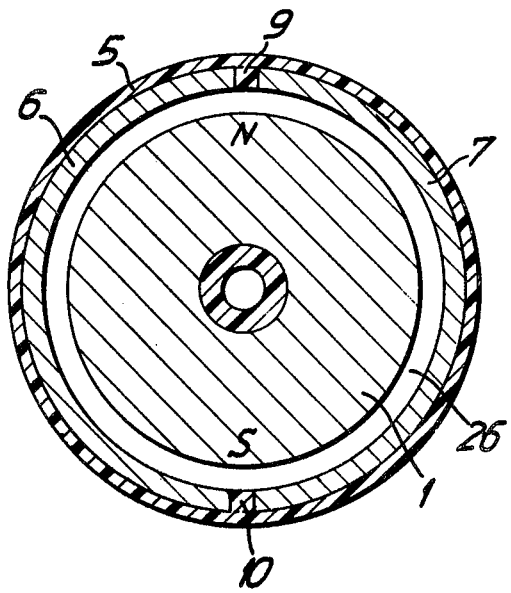
FIG. 2 is a sectional view along line II—II of FIG. 1 of the stator.

FIGS. 1 and 2 illustrate a d.c. motor that has a stator which is manufactured according to the invention. The stator includes a cylindrical permanent magnet 1 which is provided with a central aperture 2. The magnet 1 is embedded in an injection molded element 3 which extends through the central aperture 2 and forms the face plate 4 of the housing as well as the outer casing 5. This casing surrounds a flux return element which consists of a pair of half-cylindrical shells 6 and 7. These are separated from one another circumferentially by slots 9 and 10, which are filled by the injecting molding mass and thus are solidly held, preventing any displacement of the shells 6 and 7.

Figure 3:
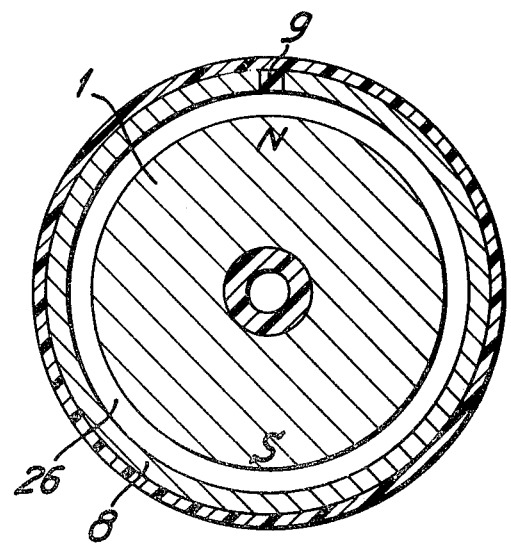
FIG. 3 is a sectional view similar to FIG. 2 of an alternate embodiment of the flux return part.

Instead of a pair of cylindrical half-shells, a tubular flux return ring may be alternately used. In another alternate embodiment, the tubular flux return ring may be provided with a single longitudinal slot, as is shown in FIG. 3.

The injection molded element 3 is provided with a central bore 11 which extends throughout the length thereof. At both ends, the central bore is recessed, which recesses form seats to receive bearings 12 and 13.

An annular seal 25 abuts against the front edges of the shells 6 and 7, which form the flux return part 8, adjacent the face plate 4 as well as the end face of the permanent magnet 1.

The above-described stator is adapted to receive a bell-shaped rotor 17 which is fixed to a shaft 15 rotatable in the bearings 12 and 13. A cover plate 21 is fixed to the open end of the casing 5 and holds brush springs 24 which bear against the commutator 19 of the rotor and are fixed to terminal strips 22 and 23.

Figure 4:
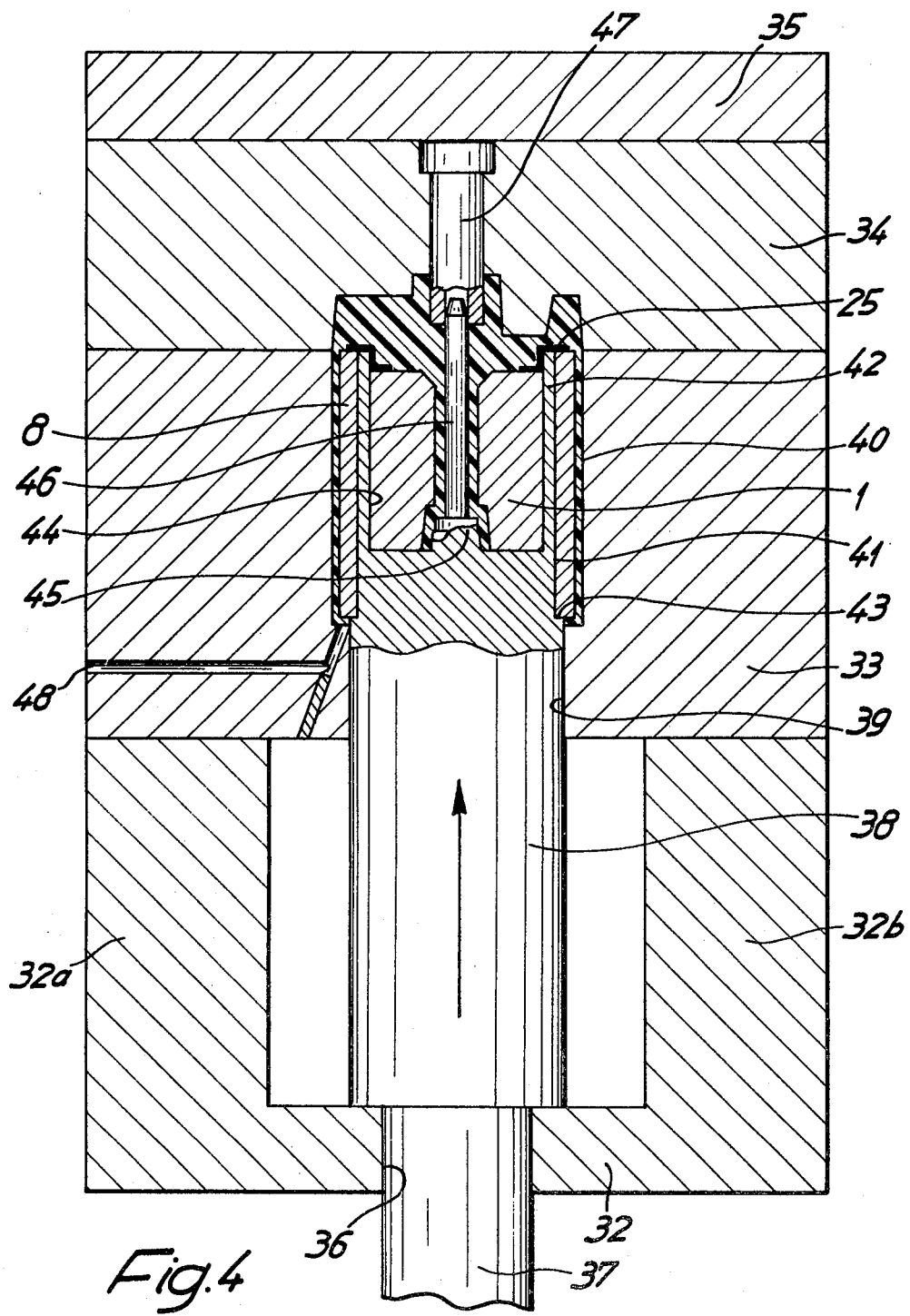
FIG. 4 is a longitudinal cross sectional view of a die for assembling the stator.

FIG. 4 shows an apparatus for performing the preferred method of assembling or manufacturing a stator for an electric machine. The apparatus 31 comprises a base 32 having upstanding portions 32a, 32b, which support a die 33, which is covered by a casting mold 34. The latter is covered by a cover plate 35.

Through a bore 36 in the base 32 extends the recessed portion 37 of a plunger 38 which is slidably movable in a bore 39 of the die 33. Bore 39 in the die 33 has a cutout portion 40, the diameter of which corresponds to the desired diameter of the finished stator.

The second portion 34 forms a die, the configuration of which corresponds to the outer surface of the face plate of the finished stator.

The plunger 38 is provided at its upper end with a recess 41 that extends from the free end of the plunger 38 over a length corresponding to the length of the flux return ring 42 of the stator. Recess 41 ends in a shoulder 43 which forms an abutment for the flux return ring 42. At the recess 41, the plunger 38 has a diameter corresponding to the outer diameter of the air gap space.

The plunger 38 is provided at its free end with a blind bore 44, the diameter of which corresponds to the inner diameter of the desired air gap space. At the bottom of blind bore 44 a centrally arranged protrusion is provided which supports a stud 46 extending into a tube-like insert 47 of the second die 34 which, as will be seen, acts also as a casting mold.

For manufacturing a stator with the apparatus shown in FIG. 4, the cover plate 35 and the first casting mold 34 are removed. A permanent magnet 1 is placed into the blind bore 44 until it butts against the bottom of the same. A flux return ring 8 which may be provided with a longitudinal slot or may consist of a pair of shells, is placed around the recess 41. Thereafter, a sealing ring 25 is placed against the upper side face of the permanent magnet 1 as well as of the flux return ring 8. Thereafter, the die 34 and the cover plate 35 are brought into the position shown in FIG. 4 and a plastic material is injected through the conduit 48 into the cavity in any well known manner and is allowed to cure. Thereafter, the second die 34, also referred to as a casting mold and the cover plate 35 are removed and the plunger 38 is moved in the direction of the arrow, so that the finished stator may be easily removed from the die punch 33. The same is lowered into the position shown in FIG. 4 in preparation of the next manufacturing cycle.

Figure 5:
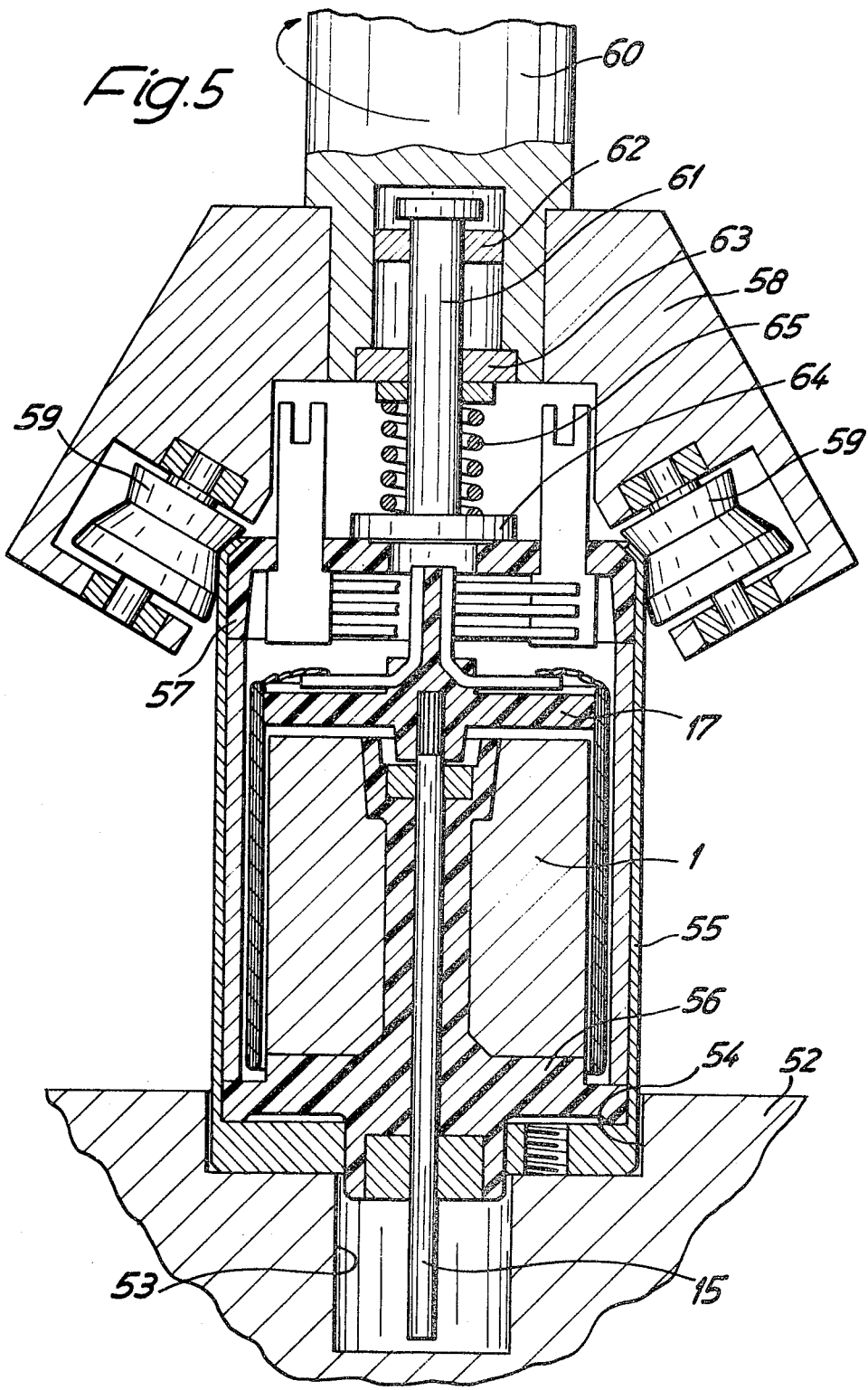
FIG. 5 is a side elevational view partly in a longitudinal cross section showing an apparatus for performing an alternate method, in which a metal casing is used instead of a plastic casing.

FIG. 5 shows an alternate apparatus for manufacturing a stator according to the invention. The apparatus comprises the base plate 52 that is provided with a blind bore 53 which has an adjacent recessed portion 54 adapted to receive a cup-like shaped housing 55 which is made of aluminum.

The apparatus further comprises a driven shaft 60 to which a rotating head 58 is fixedly secured. The driven shaft 60 has a blind bore at its lower side face, and a plunger 61 is supported by bearings 62 and 63 in the blind bore.

The rotating head 58 is provided at its underside with a recess into which the lower side of plunger 61 protrudes. A collar 64 fixed to the lower end of plunger 61 is biased downwardly by a spring 65.

The rotating head 58 is provided with a pair of diametrically opposing rollers 59, the circumferential surface of which has inwardly tapered portions.

In order to assemble an electric machine, a cup-like shaped housing 55 is placed into the recessed portion 54. Thereafter, a sub-assembly consisting of a permanent magnet 1, a face plate 56 of a plastic material and two bearings held in recesses of the plastic material is inserted into the interior of the cup-like shaped housing 55.

Now, a flux return ring is inserted into the housing 55 and thereafter, a finished rotor 17 is put in place.

A cover plate 57, to which a pair of brushes and terminals are fixed, is placed into contact with the adjacent side face of the flux return ring.

Shaft 60, which has been in a high position during the aforementioned assembly, is pushed down such that the collar 64 exerts a pressure onto the upper side of the cover plate 57. Concurrently, shaft 60 is driven in the direction of the arrow; thus the rollers 59 bend a portion of the upper rim of the housing 55 inwardly against a tapered region of the cover plate 57. By this, all stationary elements of the electric machine are fixedly held together.

After the shaft 60 has been retracted upwardly, the finished electric machine may be removed.

What is claimed is:

1. A method for assembling an electric machine of the type including a permanent magnet mounted to a face plate, a generally cylindrical flux return ring spaced apart from and surrounding the magnet, a bell-shaped rotor, a cover plate including means for electrically connecting the rotor to electric terminals, and a cup-shaped metallic housing having a partially closed lower end and an open upper end and a generally cylindrical sidewall, the method comprising the following steps:
   providing a base plate having a portion thereof adapted to receive the partially closed lower end of the housing;
   locating the partially closed lower end of the housing at said portion of said base plate;
   inserting the face plate and magnet mounted thereto into the housing adjacent the partially closed lower end;
   inserting the flux return ring fully within the housing so a first edge of the ring nearest the open upper end of the housing is a first distance from the upper end;
   placing the rotor within the housing with a portion thereof disposed between the magnet and the flux return ring;
   mounting the cover plate adjacent the first edge of the flux return ring;
   providing a rotating head including rollers positioned and shaped to engage the upper end of the housing; and rotatably engaging the upper end of the housing with said rollers to bend the upper end inwardly against the cover plate to seal the electric machine within its cup shaped housing.

2. The method according to claim 1 wherein said rotating head includes plunger means for biasing the cover plate against the first end of the flux return ring.

3. The method according to claim 1 wherein said rollers have first and second inwardly tapering surface portions for engaging the upper end.

4. The method according to claim 3 wherein said first surface portion is adapted to engage an outside surface of the sidewall at the upper end of the housing along a line of contact and said second surface portion is adapted to overlie the upper end of the housing so that said second surface portion engages the upper end during said rotatably engaging step to bend the upper end inwardly.

* * * * *